United States Patent [19]
Lambert et al.

[11] Patent Number: 5,466,043
[45] Date of Patent: Nov. 14, 1995

[54] TRANSLATING HEADREST

[75] Inventors: Jeffrey T. Lambert, Commerce Township; Edward J. Walblay, Brighton, both of Mich.

[73] Assignee: Atoma International Inc., Newmarket, Canada

[21] Appl. No.: 202,182

[22] Filed: Feb. 25, 1994

[51] Int. Cl.⁶ ..................................................... B60N 2/30
[52] U.S. Cl. ............................. 297/238; 297/14; 297/61
[58] Field of Search .............................. 297/14, 61, 114, 297/238

[56] References Cited

U.S. PATENT DOCUMENTS

| | | | |
|---|---|---|---|
| 2,843,183 | 7/1958 | Luckhardt | 297/61 |
| 2,843,184 | 7/1958 | Lorenz | 297/61 |
| 4,540,216 | 9/1985 | Hassel, Sr. | |
| 4,756,573 | 7/1988 | Simin et al. | |
| 4,900,087 | 2/1990 | Crisp | |
| 4,943,112 | 7/1990 | Law | |
| 4,986,600 | 1/1991 | Leblanc et al. | |
| 5,026,118 | 6/1991 | Vander Stel et al. | |
| 5,100,199 | 3/1992 | Vander Stel et al. | |
| 5,106,158 | 4/1992 | Dukatz et al. | 297/238 X |
| 5,224,756 | 7/1993 | Dukatz et al. | 297/238 |
| 5,280,995 | 1/1994 | Elton | 297/404 X |
| 5,282,667 | 2/1994 | Elton et al. | 297/238 |
| 5,282,668 | 2/1994 | Huessner et al. | 297/238 |

FOREIGN PATENT DOCUMENTS 2720954 12/1977 Germany.
2023415 1/1980 United Kingdom.

*Primary Examiner*—Peter R. Brown
*Attorney, Agent, or Firm*—Cushman, Darby & Cushman

[57] ABSTRACT

A motor vehicle seat comprising a child seat module. The seat includes a seat frame assembly, a seat cushion, a seat back frame assembly, and a plurality of cushion assemblies movable between i) an adult mode position wherein they provide support to the back of an adult seat occupant and ii) a child mode position wherein they provide support for a child seat occupant. The plurality of cushion assemblies include movable first and second cushion assemblies. The first cushion assembly moves between (a) the adult mode position wherein it provides a cushioned adult seat back lower portion, and (b) the child mode position wherein it provides a child's seat support. The movable second cushion assembly includes an upper cushioned pad for providing support to an adult seat occupant in the adult mode position and is operatively connected to the first cushion assembly so that movement of the movable first cushion assembly causes responsive movement of at least the upper cushioned pad of the movable second cushion assembly. The upper cushioned pad is moved i) upwardly in response to movement of the first cushion assembly from the adult to child mode position to provide support to the back of the head of a child seat occupant, and ii) downwardly in response to movement of the first cushion assembly from the child to adult mode position to provide support to an adult seat occupant sitting on the seat cushion when the cushion assemblies are in the adult mode position.

35 Claims, 5 Drawing Sheets

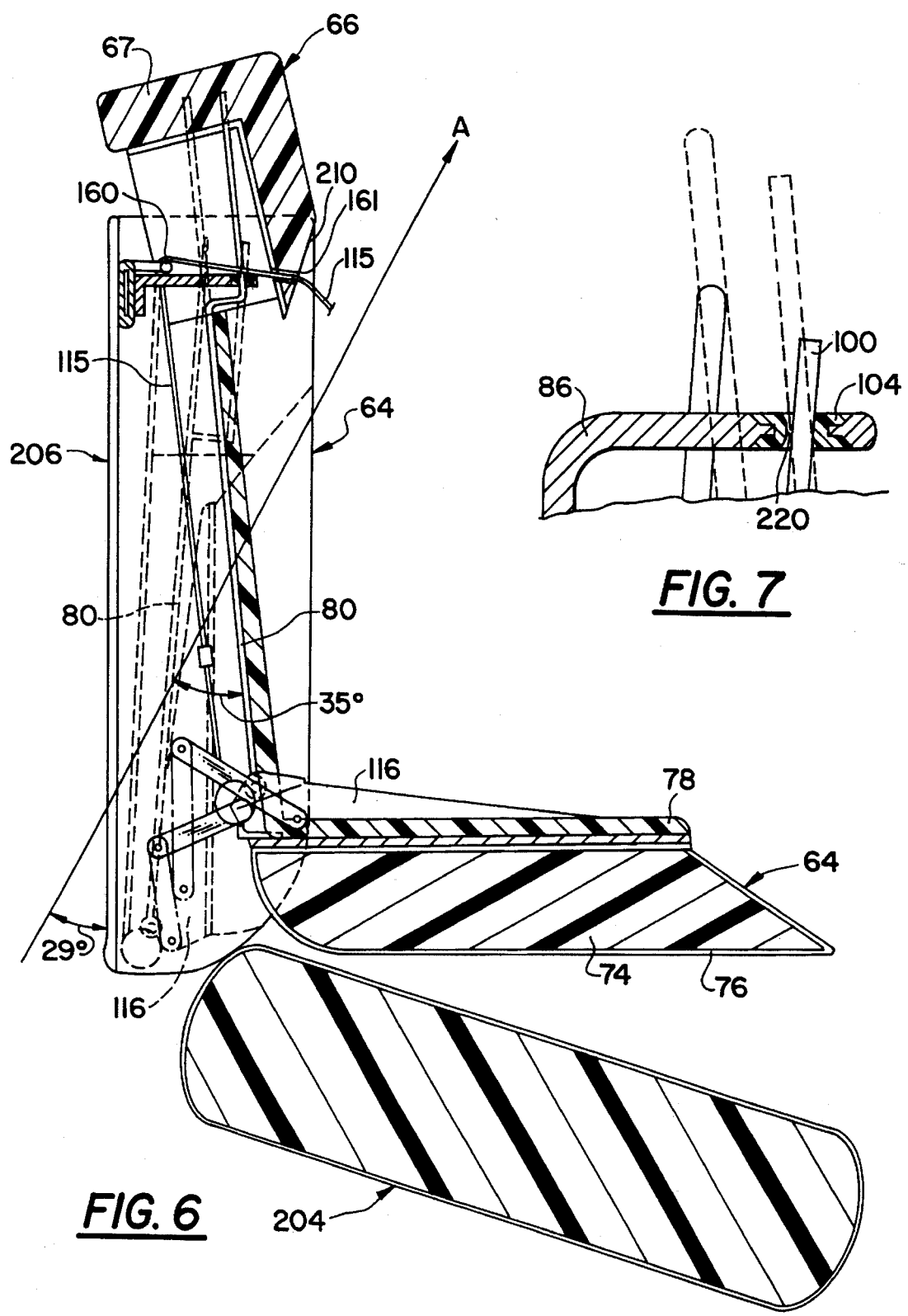

TRANSLATING HEADREST

This invention relates to vehicle seats and more particularly to integrated seats for motor vehicles capable of being moved between an adult mode position and a child mode position.

Integrated seats which contemplate both a child and an adult mode are to be contrasted with the general practice which exists wherein the seats provided are adult seats and separate child seat units are used to accommodate children. The usual situation is that the separate units contain their own seat belt assemblies or occupant restraints and the separate child's unit is affixed to the existing adult seat by strapping the separate child unit to the adult seat by the adult seat belt assembly.

A characteristic of the separate child unit commercially available is that they are used for limited periods of time during the growth years. For example, it is usual to provide a separate infant unit which is used only during the first year or until the child reaches a weight of about twenty pounds. Thereafter, a different separate child's unit must be used. During the period from one year up to six or seven, the child's weight and dimensions increase significantly and the child's ability changes from one in which an adult must interface the child with the seat and restraint system to one in which the child becomes capable of interfacing with the seat and restraint system.

It is well known that separate child seat units present a measure of inconvenience in installation in that some time and effort is required to install the separate child's unit on the adult seat when it is desired to have the seat used by a child and to remove the installed child seat when it is desired to have the seat used by an adult.

The patented literature contains many proposals for eliminating this inconvenience inherent in the use of separate child seat units by providing an integrated seat structure capable of being easily and conveniently moved between an adult mode position and a child mode position. Examples of such patented literature include U.S. Pat. Nos. 4,540,216, 4,756,573, 4,900,087, 4,943,112, 4,986,600, 5,282,667, and 5,282,668, British Patent No. 2,023,415, and German Offenlegungsschrift 27 20 954.

To date, these proposals have not received any widespread use. The present invention is based upon the underlying thought that, in order for an integrated seat to achieve widespread acceptance, it must advantageously be convenient to use, easy to deploy, and offer adequate protection for child seat occupant sitting in the seat when the seat is in the child mode position.

Thus, it is an object of the present invention to provide a motor vehicle seat having an integrated child seat that achieves the above advantages. To accomplish this object, the seat comprises a seat frame assembly for securement within the motor vehicle interior, and a seat cushion carried by the seat frame assembly in a position to enable an adult occupant of the motor vehicle to sit thereon. A seat back frame assembly is mounted in operative relation with respect to the seat frame assembly, and side cushions are carried by the seat back frame assembly in positions to be engaged by the back of an adult seat occupant sitting on the seat cushion. The side cushions are spaced apart a distance sufficient to define a space therebetween of a size to enable a child to be disposed therebetween. Also provided are a plurality of cushion assemblies constructed and arranged to be moved between i) an adult mode position wherein the cushion assemblies are disposed within the space and provide support to the back of an adult seat occupant sitting on the seat cushion and ii) a child mode position wherein the cushion assemblies provide a cushioned child seat, a cushioned child seat back, and a cushioned child seat head support for supporting the seat, back and head of a child seat occupant respectively. The plurality of cushion assemblies include (1) a movable first cushion assembly mounted for movement between (a) the adult mode position wherein the movable first cushion assembly is disposed within the space and provides a cushioned adult seat back lower portion for engaging the lower back of an adult seat occupant sitting on the seat cushion, and (b) the child mode position wherein the movable first cushion assembly is disposed in such a position so as to provide a child's seat support in overlying relation to the seat cushion, and (2) a movable second cushion assembly including an upper cushioned pad disposed in the space and providing support to an adult seat occupant sitting on the seat cushion when the cushion assemblies are in the adult mode position. The movable second cushion assembly is operatively connected to the first cushion assembly so that movement of the movable first cushion assembly causes responsive movement of at least the upper cushioned pad of the movable second cushion assembly. The upper cushioned pad is moved i) upwardly in response to movement of the first cushion assembly from the adult mode position to the child mode position so that the upper cushioned pad provides support to the back of the head of a child seat occupant sitting on the movable first cushion assembly providing the child's seat support in overlying relation to the seat cushion, and ii) downwardly in response to movement of the first cushion assembly from the child mode position to the adult mode position so that the upper cushioned pad provides support to an adult seat occupant sitting on the seat cushion when the cushion assemblies are in the adult mode position. Also provided is a harness assembly constructed and arranged for extension over the shoulders of a child seat occupant sitting on the child seat when said plurality of cushion assemblies are in the child mode position, the harness assembly having an anchor point disposed between the legs of a child seat occupant.

The present invention is also concerned with another aspect relating to the convenience in use of such child seat modules. In the usual case, an integrated child seat has at least the child seat back rigidly or pivotally fixed to the automobile seat back frame. At the same time, in the usual case, the child seat support rests upon the adult seat cushion when deployed. When the child seat back is reclined, for example, when an adult is occupying a portion of the seat adjacent to the deployed child seat, the child seat back will be moved therewith and reclined as well. When the child seat back is reclined in this fashion, the child seat typically remains resting on the adult seat as the child seat and child seat back are not fixed in angular relation to one another. It can be appreciated, therefore, that as the adult seat back is reclined, a greater angle is formed between the child seat and child seat back. This presents a problem in that as the angle between the child seat back and child seat is increased so as to cause the child's torso to move rearwardly in the vehicle and become straightened relative to his legs, and the child seat occupant will have a tendency to slide forwardly out of the seat during sudden stoppages of the vehicle. Additionally, because integrated child seats of this type are normally provided with at least a three point child seat harness, with one of said points being provided by a crotch belt disposed between the legs of the child seat occupant, such sudden stoppages may impose an uncomfortable load on the child's crotch area via the crotch belt, as opposed to the preferred situation wherein the majority of the load is absorbed by the child's upper torso through shoulder belts forming the other two points of the three point harness.

At the same time, however, it is desirable to have the child seat back inclined at a greater angle with respect to vertical than the back of an adult seat back. For example, while it is preferred to have the adult seat back inclined at about 29° to vertical, the child seat back is preferably inclined at an angle of about 40° to vertical when the child is sleeping and about 30° to vertical when the child is awake.

In the situation where the child seat back is rigidly fixed to the adult seat back, the child seat back is normally disposed substantially parallel to the adult seat back, as there is insufficient thickness within the adult seat back to accommodate any different inclination. There still exists a need for an integrated child seat which can provide a desired rearward inclination to the child seat while at the same time retaining the desired angular relationship between the child seat back and child seat. See, for example, U.S. Pat. No. 5,224,756. U.S. Pat. No. 5,282,668 provides an arrangement for changing the angle of the child seat back in conjunction with the movement of the child seat into its child mode position but the child seat rests upon the adult seat cushion so as to present a more undesirable angle between the child seat and seat back. U.S. Pat. Nos. 4,986,600, 5,026,118 and 5,100,199 provide for adjustment of the inclination of the child seat back in coordination with the forward movement of the child seat in supported relation on the adult seat. Here again the angular relation between the child's back and seat is increased beyond optimum.

Thus, it is an object of the present invention to provide a motor vehicle seat having an integrated child seat that fulfills the above mentioned need. To accomplish this object, the seat comprises a seat frame assembly for securement within the motor vehicle interior. A seat cushion is carried by the seat frame assembly in a position to enable an adult occupant of the motor vehicle to sit thereon. A seat back frame assembly is mounted in operative relation with respect to the seat frame assembly, and side cushions are carried by the seat back frame assembly in positions to be engaged by the back of an adult seat occupant sitting on the seat cushion. The side cushions are spaced apart a distance sufficient to define a space therebetween of a size to enable a child to be disposed therebetween. Also included are a plurality of cushion assemblies constructed and arranged to be moved between i) an adult mode position wherein the cushion assemblies are disposed within the space and provide support to the back of an adult seat occupant sitting on the seat cushion with a desired angular relationship between the adult seat occupant's seat and back and ii) a child mode position wherein the cushion assemblies provide a cushioned child seat, a cushioned child seat back, and a cushioned child head support for supporting the seat, back and head of a child seat occupant respectively. The plurality of cushion assemblies include (1) a movable first cushion assembly mounted for movement between (a) the adult mode position wherein the movable first cushion assembly is disposed within the space and provides a cushioned adult seat back lower portion for engaging the lower back of an adult seat occupant sitting on the seat cushion, and (b) the child mode position wherein the movable first cushion assembly extends in self-sustaining cantilevered overlying relation to the seat cushion to provide a child's seat support which extends forwardly and upwardly to a greater extent than the seat support provided by the seat cushion, and (2) a movable second cushion assembly providing a child's seat back support disposed within the space inwardly of the first movable cushion assembly when the cushion assemblies are in the adult mode position. The movable second cushion assembly is operatively connected to the first cushion assembly so that movement of the movable first cushion assembly causes responsive movement of the movable second cushion assembly. The movable second cushion assembly is movable i) angularly in one direction in response to movement of the first cushion assembly from the adult mode position to the child mode position so that the child's seat back support extends upwardly and rearwardly to a greater extent than the adult back support and provides support to the back of a child seat occupant sitting on the child's seat support provided by the movable first cushion assembly with a desired angular relationship between the child seat occupant's seat and back, and ii) angularly in an opposite direction in response to movement of the first cushion assembly from the child mode position to the adult mode position. In addition a harness assembly is constructed and arranged for extension over the shoulders of a child seat occupant sitting on the child seat when the plurality of cushion assemblies are in the child mode position, the harness assembly having an anchor point disposed between the legs of a child seat occupant.

The arrangement described above has advantages irrespective of whether the adult seat back is fixed or capable of reclining, both of which are contemplated by the present invention. In the case of a fixed adult seat back, the child seat back can be inclined rearwardly to a position (e.g. 35° from vertical) which is between a desirable upright position (e.g. 30° from vertical) and a desirable sleeping position (e.g. 40° from vertical) while still maintaining a desirable angular relationship between the child's back and seat. On the case of a reclining seat back, the desired angular relationship between the child's back and seat is maintained through any desired position of inclination that is set.

As this latter aspect of the invention is in large part concerned with the movement of the child seat back support, and in the broadest aspects is not concerned with a movable headsupport, it can be appreciated that the invention can be used with either low back rests such the bench type vehicles, or high back rests as provided in sedan motor vehicles which have fixed or stationary head supports.

Other objects of the present invention include the provision of a seat and/or a child's seat module of the type described which is simple in construction, effective in operation and economical to manufacture.

These and other objects of the present invention will become more apparent during the course of the following specification and claims.

The invention can best be understood in conjunction with the accompanying drawings wherein illustrated embodiments are shown.

DESCRIPTION OF THE DRAWINGS

FIG. 6 is a vertical sectional view taken through the seat, including the child seat module of the present invention, taken along the line 6—6 in FIG. 4 and shows the child seat module in solid lines in its child mode position and in dotted lines in its adult mmode position.

FIG. 7 is a sectional side view of the fixed guide members of the present invention, including the bushings thereof.

Figure 1:
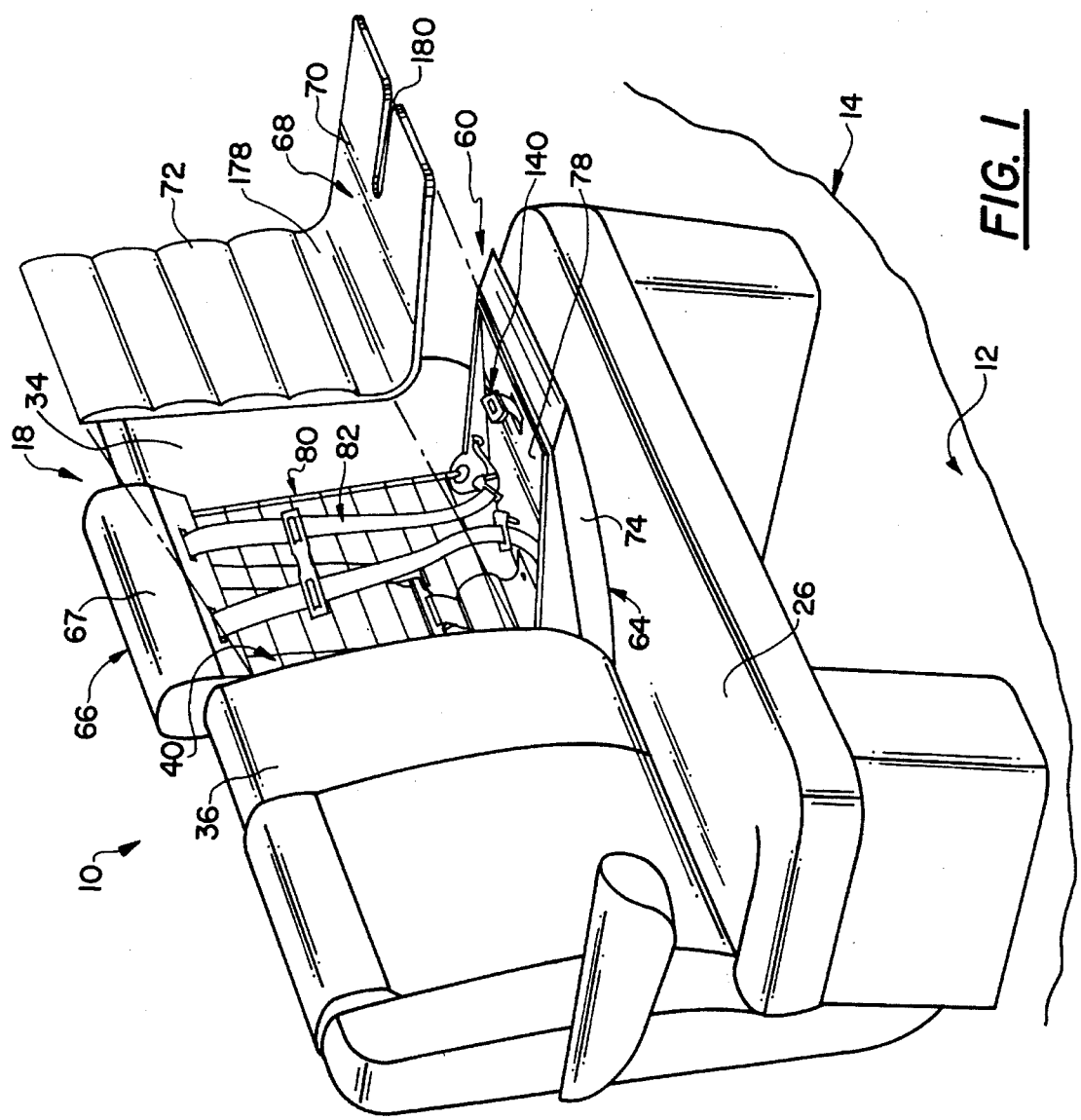
FIG. 1 is a perspective view of a seat embodying the principles of the present invention installed in a motor vehicle and showing the child seat module disposed in its child mode position.

Referring now more particularly to the drawings, there is shown in FIG. 1 an automobile seat, generally indicated at 10, embodying the principles of the present invention, the seat 10 being shown mounted on the floor 12 of a motor vehicle 14. The seat 10 shown is a two occupant bench seat of the type installed in the middle of a van type motor vehicle having a side entrance door (not shown) near the side of the seat, as shown. As shown, the left operative position of the bench seat 10 is provided with a child's seat module, generally indicated at 18, embodying the principles of the present invention. It will be understood that an additional, similar child's seat module 18 may also be provided in the right-hand operative position of the bench seat 10.

The child's seat module 18 of the present invention is suitable to be fixed to the seat back frame of any vehicle seat, including single, tandem, or three-occupant bench seats with fixed or movable seat backs. The two-occupant bench seat 10 shown is considered to be particularly desirable since it is a seat, which by virtue of the type of motor vehicle involved, will often be occupied by one or more children.

The two-occupant bench seat 10 presents particular requirements because of the relatively low back construction provided in conventional bench seats of this type heretofore utilized, when compared, for example, to the seat back in the back of a sedan type motor vehicle. It will be understood that certain principles of the present invention are applicable only to the low back seat as shown, while other principles are directed to both high back and low back seats as mentioned hereinbefore.

Figure 2:
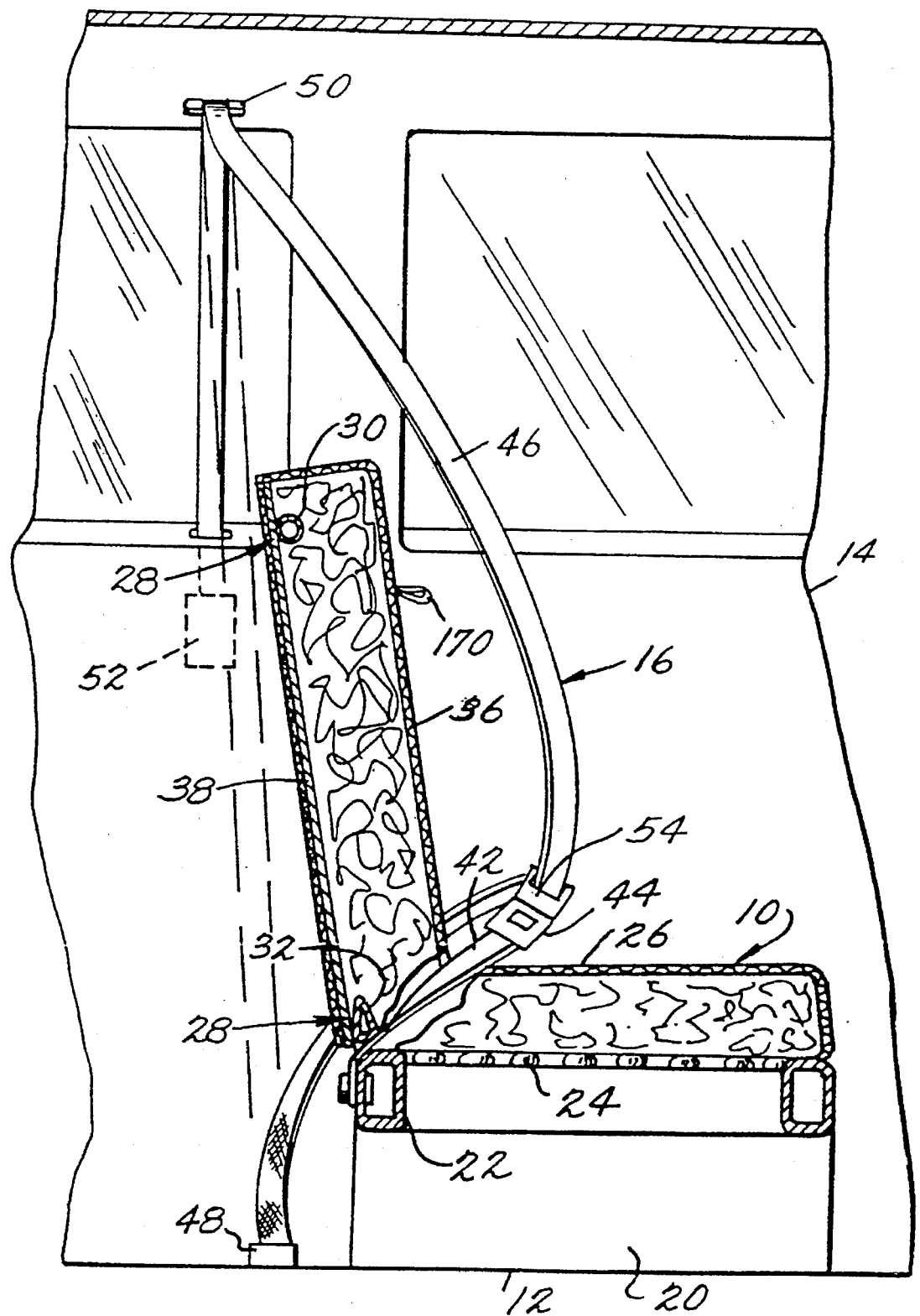
FIG. 2 is a vertical sectional view through the mid portion of the seat showing the seat frame and cooperating connections of an adult seat belt assembly.

Referring now more particularly to FIG. 2, it will be noted that the two occupant bench seat 10 includes a pair of spaced risers 20 of conventional construction including lever actuated gripper assemblies (not shown) for releasably gripping floor cleats (not shown) so as to enable the seat 10 to be readily removed. Fixed to the upper ends of the risers 20 is a main seat frame 22 likewise of conventional construction. The main seat frame 22 is shown somewhat schematically as being a tubular rectangular peripheral structure having suitable springs 24 suspended in the open central position on which is supported a covered seat cushion 26 of conventional construction. As shown, the width of the seat cushion 26 is sufficient to enable two adult seat occupants to sit thereon in side-by-side operative positions. As also shown, the seat is provided with an adult seat belt assembly 16 for use by an adult sitting on seat cushion 26.

The seat 10 also is provided with a seat back frame, generally indicated at 28, which also is preferably of conventional configuration. As shown, the seat back frame 28 includes a main inverted U-shaped frame member 30 positioned so that the lower free ends of the leg positions are rigidly fixed to the rearward sides of the main seat frame 22 and the central bight portion extends along the upper extent of the seat back. A lower tubular horizontal frame member 32 is welded or otherwise fixed between the leg positions of the main U-shaped frame member 30. Instead of the usual continuous cushioned sleeve which is extended over the seat back frame to form the seat back, the seat back is modified to accept the child's seat module 18.

Referring now to FIG. 2, it will be noted that the adult seat belt assembly 16 is mounted within the motor vehicle 14 in a position to cooperate with a seat occupant sitting on the left-hand operational position of the seat cushion 26. The adult seat assembly 16 can assume different configurations, however, as shown, the assembly 16 includes a belt section 42 fixed to the rearward central position of the main seat frame 22 and extending therefrom forward between the seat cushion 26 and the seat back side cushion 36. The belt section 42 carries a releasable buckle assembly 44 of conventional construction at its opposite end.

A main belt section 46 is anchored at one end to the floor, as indicated at 48, and extends therefrom over a fixed guide 50 mounted on the left side of the vehicle near the roof. From the fixed guide 50, the belt section 46 extends downwardly to a take up reel assembly 52 of conventional construction suitably mounted in the left side of the vehicle 14. The extent of the belt section 46 extending from the floor anchor 48 to the roof guide 50 has a clip element 54 slidable thereon capable of being releasably engaged by the buckle assembly 44.

In accordance with usual procedure, an adult occupant in the left operative position on the seat cushion 26 is able to move the seat belt assembly 16 into operative relation by grasping the clip element 54 and bringing it across that seat occupant's chest into engaged relation to the buckle assembly 44. In this way, a lower extent of the belt section 46 between the floor anchor 48 and the clip element 54 extends over the seat occupant's waist and an upper extent of the belt section 46 between the clip element 54 and the fixed guide 50 extends across the left shoulder of the seat occupant.

When a small child (e.g. between 20 and 40 pounds) is sitting on the cushioned child's seat with the child's back and head engaged against the cushioned child's back and head support, the child's seat belt assembly 82 (see FIG. 1) of the module 18 is used as a restraint for the small child in the child's seat module 18.

The child's seat belt assembly 82 is movable into a child's booster seat position so that the child seat module can be used with a larger child (e.g. above 40 pounds). To accomplish this, the child's seat belt assembly 82 is moved into the booster seat position by detaching the cushion pad 68, as shown in FIG. 1, and replacing it so that the child's seat belt assembly 82 is disposed rearwardly and beneath the cushion pad 68. In this way, the child's seat belt assembly 82 remains with the module 18 for use simply by detaching the cushion pad 68, deploying the child's seat belt assembly 82 and then replacing the cushion pad 68. Then, the larger child sitting on the cushioned child's seat with the child's back and head engaging the cushioned child's back and head support of the module 18 when the child's seat belt assembly 82 is in its booster seat position. The module 18 acts as a booster seat for the larger child enabling the larger child to more conveniently see out of the vehicle windows and to more conveniently effect restraint by simply using the adult seat belt assembly 16.

The description to follow will indicate the modifications necessary to install one child's seat module 18 in the left-hand operative position of the bench seat 10. It will be understood that the right-hand operative position can be similarly modified to install a second child's seat module 18 therein, if desired.

Referring to FIGS. 1 and 2, the modification required is to replace the normal seat back cushion mounted forwardly of the seat back frame 28 with a pair of side cushions 34 and 36 spaced apart a distance sufficient to fit a child therebetween. The side cushion 34 and 36 fixed forwardly of the frame 28 are suitably covered. A conventional backing 38 is provided rearwardly of the frame 28. The spacing between the side cushions 34 and 36 defines a space 40 between the side cushions 34 and 36 forwardly of the seat back frame 28 sufficient to receive a child therebetween and within which to mount the child's seat module 18.

As shown in FIG. 1, the child seat module 18 includes a plurality of cushion assemblies 60 carried by and connected with the seat back frame 28. In the embodiment shown, the cushion assemblies 60 include a lower movable seat cushion assembly (or "first cushion assembly"), generally indicated at 64, an upper movable cushion assembly (or "second cushion assembly"), generally indicated at 66, and a cushion pad, generally indicated at 68. The movable cushion assemblies 60 are movable between i) an adult mode position (e.g., see left hand side of seat in FIG. 2) wherein the cushion assemblies 60 are disposed within the space 40 and provide support to the back of an adult seat occupant sitting on the seat cushion 26 and ii) a child mode position (e.g., see right hand side of seat in FIG. 2) wherein the cushion assemblies provide a cushioned child seat, a cushioned child seat back, and a cushioned child seat head support for supporting the seat, back and head of a child seat occupant respectively.

The lower movable seat cushion assembly 64 includes an foamed cushion 74 having an outer fabric cover 76, and a rigid structure 78 (see FIG. 6). The cushion assembly 64 may also be provided with a nylon pull strap 84, which can be pulled outwardly to deploy the child seat. A more detailed description of the construction of cushion assembly 64 is disclosed in U.S. Pat. No. 5,224,756 which is hereby incorporated by reference.

The lower moveable seat cushion assembly 64 is mounted for movement between (a) the adult mode position wherein the movable seat cushion assembly 64 is disposed within the space 40 and provides a cushioned adult seat back lower portion for engaging the lower back of an adult seat occupant sitting on the seat cushion 26, and (b) the child mode position wherein the lower movable seat cushion assembly 64 is disposed in such a position so as to provide a child's seat support in overlying relation to the seat cushion 26.

The upper movable cushion assembly 66 includes an upper cushioned pad 67. When in the adult mode, the upper cushioned pad 67 is substantially disposed in space 40 and provides support to an adult seat occupant sitting on seat cushion 26.

The upper movable cushion assembly 66 is operatively connected to the lower cushion assembly 64 through a child seat back frame 80 so that movement of the lower cushion assembly 64 causes responsive movement of the upper cushioned pad 67. The upper cushioned pad is moved i) upwardly in response to movement of the lower cushion assembly 64 from the adult mode position to the child mode position so that the upper cushioned pad 67 provides support to the back of the head of a child seat occupant sitting on the lower cushion assembly, and ii) downwardly in response to movement of the cushion assembly from the child mode position to the adult mode position so that the upper cushioned pad provides support to an adult seat occupant sitting on seat cushion 26 when said cushion assemblies are in the adult mode position.

As shown in the right hand side of FIG. 1, in the child mode position, the lower seat cushion assembly 64 extends from the bottom of the space 40 in overlying relation to the seat cushion 26 so as to provide, with a seat portion 70 of the cushion pad 68 detachably mounted thereon, a cushioned child's seat. As also shown in FIG. 1, and more clearly shown in FIG. 6, the foamed cushion 74 of lower seat cushion assembly 64 does not contact seat cushion 26, but is rather somewhat inclined relative thereto and rigidly maintain as such when the cushion assemblies 60 are in the child mode position.

As shown in FIG. 1, the cushion pad 68 is detachably mounted with respect to the lower seat cushion assembly 64 and the child seat back frame 80 to provide a cushioned child's seat. The detachable securement of the cushion pad 68 is provided so that the pad can be cleaned easily. Any suitable means may be used to accomplish this detachable mounting, such as VELCRO strips. The provision of such VELCRO strips to accomplish this function is disclosed in our previously filed U.S. patent application Ser. No. 882,610 by Czapski et al, which is hereby incorporated by reference.

Figure 3:
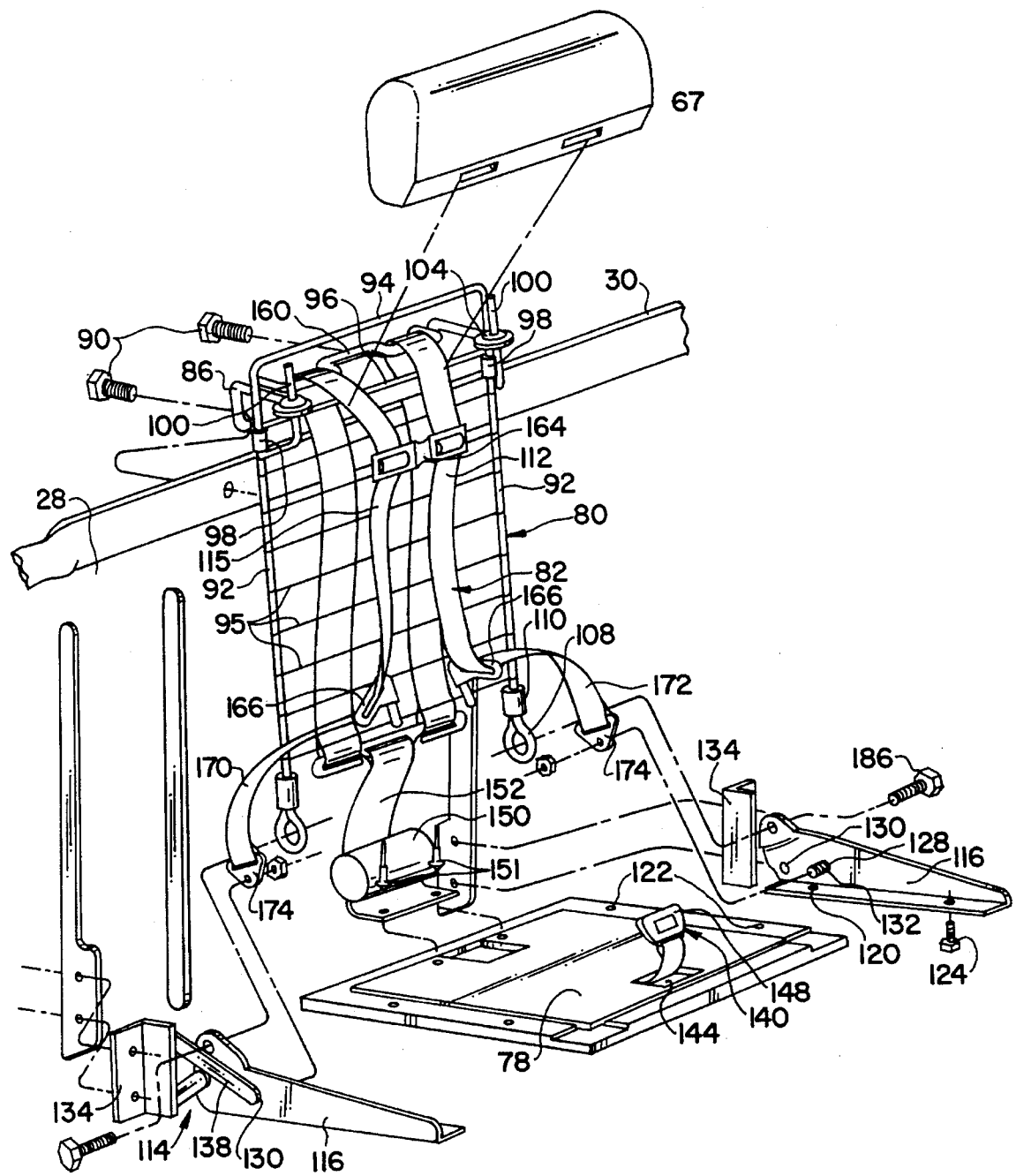
FIG. 3 is an exploded perspective view of a child's seat module embodying the principles of the present invention with the child's cushion pad removed to more clearly show the connection of the child seat back frame of the module to the seat back frame.

As also shown in FIGS. 1 and 3, a child's seat belt assembly, generally indicated at 82, is carried by the child seat back frame 80. When a child is sitting on the cushioned child's seat with the child's back and head engaged against the cushioned child's back and head support, the child's seat belt assembly 82 of the module 18 is used as a restraint for the child.

Referring now more particularly to FIG. 3, the child's seat module 18 is shown therein in exploded perspective so as to show its construction and illustrate the manner in which it is mounted on the seat back frame 28 between the side cushions 34 and 36.

The child seat back frame 80 includes fixed guide members 86 rigidly attached or affixed to the seat back frame 28 by suitable fasteners, as indicated at 90.

The child seat back frame 80 includes a pair of spaced vertical rod members 92 which are integrally connected at their upper ends by a horizontal rod member 94 and have a plurality of evenly spaced horizontal wire members 95 extending therebetween. It can be appreciated that the rod members 92 and/or 94 can be provided with the aforementioned VELCRO strips in order to secure the cushion pad 68 thereto. Alternatively, any other suitable means, such as cloth ties, for securing the pad to the frame 80 may be provided.

The child seat back seat frame 80 is also provided with a horizontal head support bar 96 attached to vertical rod members 92 by attachments 98. Both ends of bar 96 extend past the attachments 98 and are bent upwardly to terminate in upwardly projecting stem portions 100. The stem portions 100 are disposed substantially in parallel to the vertical rod members 92. Fixed guide members 86 are provided with substantially annular bushings 104 which receive the aforementioned stem portions 100 in slidable relation.

The lower portions of vertical rod members 92 are bent to form substantially annular portions 108 closed off by a suitable closure, as indicated by 110. The annular portions 108 are operatively connected to lower cushion assembly 64 via a four-bar linkage assembly, generally indicated at 114, and a pair of movable side support members 116, as will be described below.

As shown, the lower seat cushion assembly 64 includes a rigid structure, generally indicated at 78 in the form of a rectangular seat pad support platform molded of suitable structural plastic material. The pair of parallel movable side support members or brackets 116 are disposed on opposite sides of the rigid structure 78. Movable brackets 116 and rigid structure 78 are provided with respective openings 120 and 122, which are adapted to having suitable fasteners 124 extended therethrough to secure the rigid structure 78 to the movable brackets 116.

A pair of mounting anchor members or brackets 134 are rigidly fixed to the seat back frame 28, and each are respectively cooperable with one of the movable brackets 116 through a pair of bar links or link members 138 and 140. Movable brackets 116 are each provided with plural (two) openings 128 and 130. Openings 128 of the opposing brackets are axially aligned with one another, as are openings 130. Each of the bar links or link members 138 and 140 are each pivotally mounted via a suitable fastener (e.g., bolts 132) at one end to one of the mounting brackets 134, and at the other end to one of the movable brackets to provide a four bar linkage on each side of the rigid structure as shown in FIG. 3. The four bar linkage will be described in greater detail later.

Continuing with FIG. 3, it can be seen that a crotch belt section 140, which form part of the child seat belt assembly 82, extends upwardly through opening 144 in the rigid structure 78. A conventional seat restraint belt buckle assembly 148 is secured to the exposed forward end of the crotch belt section 140. The opposite end of the belt section 140 (not shown) is suitably fastened to an underside portion of rigid structure 78.

The child seat belt assembly 82 also includes a take-up reel 150, which is mounted on a rearward portion of rigid structure 78 via suitable fasteners 151. The take-up reel generally serves as a belt tension adjuster and may be any conventionally known take-up reel, as, for example, the automatic locking retractor type (ALR) or emergency locking retractor type (ELR) or a combination of these two types. The different types of take-up reels utilize different criteria and structures (e.g., such as an inertia latch in the ELR) to shift from a pay-out to locking mode. Such take-up reels are commonly available, for example, from Indiana Mills and Manufacturing Inc. In a preferred embodiment, the ALR type reel is used.

Extending outwardly from the take-up reel is a single belt 152, which is secured at an opposite end thereof to a dividing bracket 156, which in turn has a pair of twin shoulder belts 112 and 115 extending therefrom. The shoulder belts 112 and 115 extend upwardly from the dividing bracket 156 and are looped over a belt mounting rod 160 secured to seat back frame 28, and then extend through openings 161 in upper cushion pad 67 (see FIGS. 1, 4 and 6). In an alternative embodiment, rather than openings 161, the cushion pad 67 can be provided with a recess in the headrest.

It can be appreciated that mounting rod 160 can be integrally formed with the aforementioned fixed guide members 86. After passing through the upper cushion pad 67, the shoulder belts 112 and 115 pass through a releasably interconnected guide member 164 and slotted ends of a pair of opposite hand connector members 166. The latter are adapted to be releasably connected to the buckle assembly 148. Extensions 170 and 172 of the respective belts 115 and 112 are each secured at one end thereof by brackets 174 to respective ones of the movable brackets 116. The extensions 124 and 126 serve to mount over the child's thighs.

Returning now to FIG. 1, it can be seen that the cushion pad 68 has the seat and back portions 70 and 72 connected by a flexible hinge 178 and a rectangular cut-out opening 180 is formed in the seat portion 70 for mounting around the crotch belt 140 out of the rigid structure 78. The upper edge of the back portion 72 fits against the child seat back frame 80 up to a point just below the upper cushioned pad 67.

Figure 5:
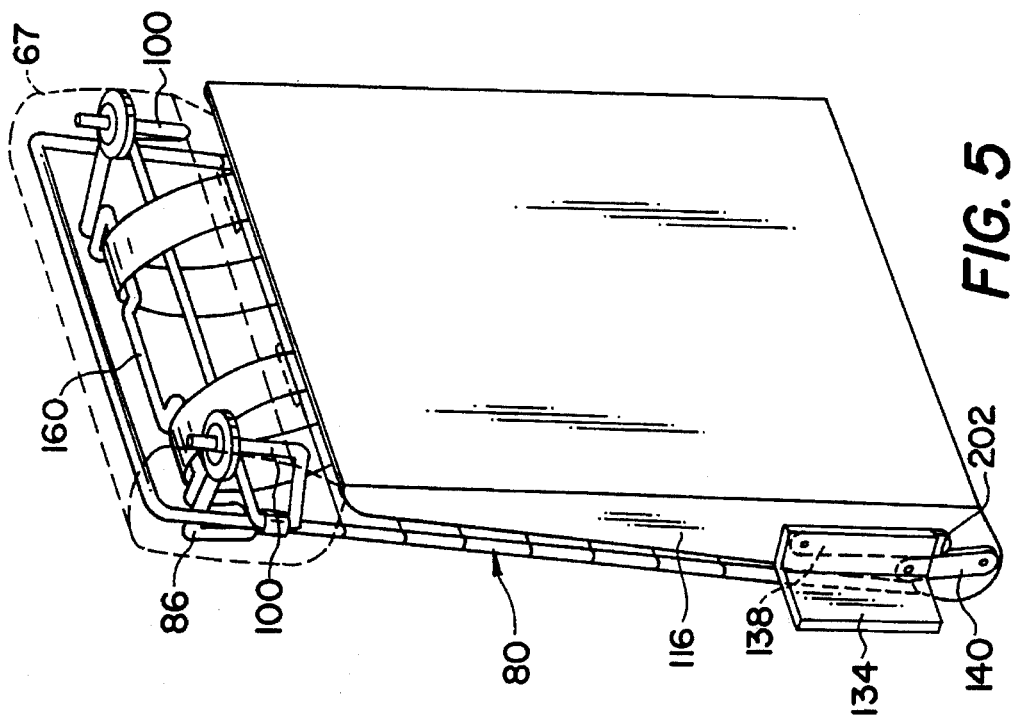
FIG. 5 is a perspective view of the child's seat module in the adult mode position with the cushion pads removed to more clearly show the configuration of the child seat frame and child seat back frame of the module in this position.
Figure 4:
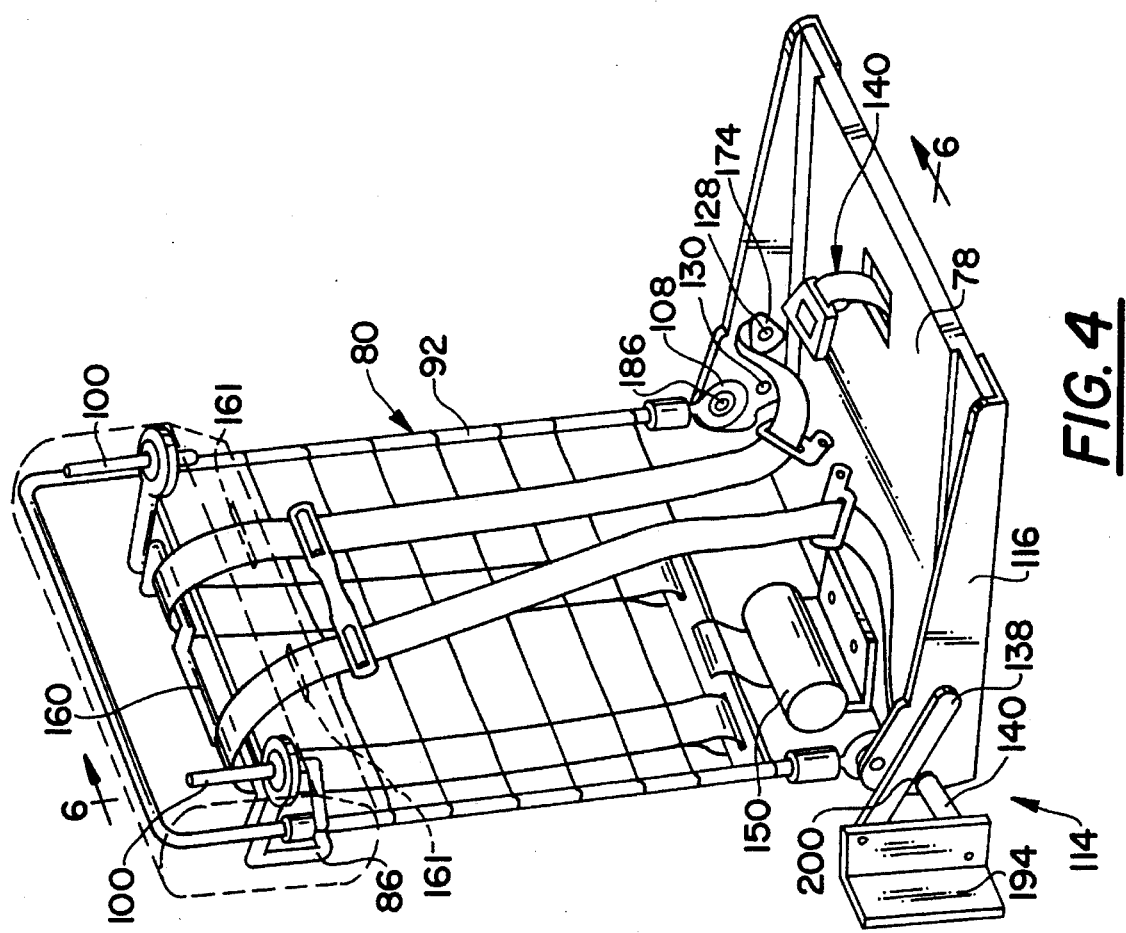
FIG. 4 is a perspective view of the child's seat module in the child mode position with the cushion pads removed to more clearly show the configuration of the child seat frame and child seat back frame of the module in this position.

FIG. 4 shows the child seat module substantially assembled in the child mode position, but with some portions missing (e.g., padding) to reveal others better. FIG. 5 is similar to Figure 4, but shows the child seat module in the adult mode position. In comparing these two figures, it can be seen that the child seat back frame 80 is disposed higher in relation to mounting brackets 134 when in the child mode position than when in the adult mode position. As can be seen, the child seat back frame 80 has the lower annular portions 108 of vertical rod members 92 pivotally connected to an appropriate location on movable brackets 116 by suitable fasteners 186. When the lower portion of the assembly (for example lower cushion assembly 64 or rigid structure 78 thereof) has a forward portion thereof manually lifted, it is caused to move or generally pivot about mounting brackets 134 via the four bar linkage assembly 114. During this motion, fastener 186 connecting the movable brackets 116 to the vertical rod members 92 via portion 108 acts as a pivot point for relative angular pivotal movement between the child seat back frame 80 and brackets 116. Relative to mounting brackets 134, the pivot point formed at connection 186 moves in a substantially "S" path of travel in moving from the position in FIG. 4 to that shown in FIG. 5, thus causing a net downward and inward movement of the pivot point.

The relatively higher position assumed by the child seat back frame 80 in the child mold can be appreciated by observing stem portions 100 thereof relative to fixed guide members 86 fixed to the seat back frame 28, which guide members receive stem portions 100 in slidable and somewhat pivotal relation as shown more clearly in FIG. 7. From FIG. 1, it can be appreciated that the upper cushioned pad 67 moves upwardly so as to project above the adult seat back when in the child mode position.

It will also be appreciated from FIGS. 4 and 5 that peripheral side surfaces of bar links 138 and 140 abut against one another to define the upper and lower positions of travel for the lower movable cushion assembly 64, including brackets 116 and rigid structure 78. In FIG. 4, such abutment is designated by numeral 200, which in FIG. 5, such abutment is designated by numeral 202.

From the above, it can be appreciated that the four bar linkage assembly 114, anchor members 134, and brackets 116 form an interconnecting assembly for connecting the upper cushion assembly 66 and lower cushion assembly 64. The frame 80 may also be considered as part of the interconnecting assembly. The interconnecting assembly functions to translate movement of the lower cushion assembly 64 into movement of the upper cushioned pad 67.

Turning now to FIG. 6, the child seat module is shown in both the adult mode and child mode positions. The adult mode position is substantially shown with dashed lines. It can be appreciated that seat 204, which includes seat cushion 26 can be disposed at a desired angular relationship with respect to seat back 206. In the child mode position, the lower movable cushion assembly 64 extends in self sustaining cantilevered overlying relation to seat cushion 26 to provide a child's seat support which extends forwardly and upwardly to a greater extent than the seat support provided by the seat cushion 26. The movable upper cushion assembly 66 provides a child's seat back support (e.g., frame 80), which disposed within space 40 inwardly of the lower movable cushion assembly 64 when the cushion assemblies are in the adult mode position.

The movable upper cushion assembly 66, including frame 80, is operatively connected to the lower movable cushion assembly 64 so that movement of said lower movable cushion assembly 64 causes responsive movement of the movable upper cushion assembly 66. The movable upper cushion assembly 66 is movable angularly in a first direction in response to movement of the lower cushion assembly 64 from the adult mode position to the child mode position so that the child's seat back support (e.g., frame 80) extends upwardly and rearwardly to a greater extent than the adult back support as provided by, for example, side cushions 34, 36 or foamed cushion pad 74 when lower cushion assembly 64 is in the adult mode. In this position, frame 80 provides support to the back of a child seat occupant sitting on said child's seat support provided by the movable lower cushion assembly 64 with a desired angular relationship between the child seat occupant's seat and back. The movable upper cushion assembly 66 is also movable angularly in second direction, opposite to the first direction, in response to movement of the lower cushion assembly 64 from the child mode position to the adult mode position.

It is clear from FIG. 6 that the aforementioned relatively upward/rearward position assumed by child seat back frame 80 translates into an upward/rearward positioning of the upper cushioned pad 67. It should be noted that while it can be said that the upper portion of upper movable cushion assembly 66, including the cushioned pad 67 is moved upwardly and rearwardly, it is also true that the bottom portion of seat back frame 80 is moved upwardly and forwardly within space 40.

As shown, seat back 206 is preferably disposed at an angle of about 29° relative to arrow A, which is normal to the vehicle floor 12. As can be appreciated, this angle can be varied to meet various safety requirements and specifications. In the embodiment shown, seat 204 is disposed at an inclined angle of approximately 10° to the vehicle floor, and thus the angular relation between the seat 204 and back 206 is approximately 109°. Again, it is possible to alter this angular configuration as desired. While it is preferred that the angle formed between seat 204 and back 206 be generally fixed at 29° to vertical, the present invention contemplates that the seat back 206 may be reclined relative to the seat 204 with any conventional reclining mechanism. It is also possible to provide a seat and back which have a permanently fixed angle therebetween, but tiltable together as a unit to alter the angle of the back to normal.

In the aforementioned examples, the angle between the child seat back and child seat in the child mode position, as defined by the angle between child seat back frame 80 and rigid structure 78 or lower movable cushion assembly 64, will remain fixed regardless of reclining or tilting of the seat back 206 and/or seat 204. Preferably, this fixed angle is between the range of 95° and 105°. This advantageously allows an adult seat occupant (e.g., sitting in the left hand side seat in FIG. 1) to recline the adult seat back 206 relative to the adult seat 204 without causing a corresponding increase in the angle between the child seat back and child seat. Such a corresponding increase in the angle between the child seat back and child seat would extend the child's torso rearwardly in the vehicle and thus create the less preferred situation wherein sudden stoppage of the automobile may cause a child seat occupant to slide forwardly within the seat as aforementioned.

Preferably, when the adult seat back is disposed at the desirable angle of about 29° to vertical, the child seat back frame 80 provides a child's back support at an angle of about 35° to vertical (arrow A in FIG. 6). This 35° angle strikes a compromise between the aforementioned desired 29° incline for an adult seat back and a desired 40° incline for a child sleeping in a child seat.

Referring more particularly now to FIG. 6, it can be seen that the upper cushioned pad 67 has a lower beveled surface 210 having the openings 161 through which shoulder belts 112 and 115 extend. Although belts 112 and 115 extend through the cushioned pad, belt mounting rod 160, which is disposed at a position higher than the openings 161, operates as the true anchor point for said belts. This configuration eliminates the need for providing adjustable shoulder belt slots, as such accommodation is provided in the automatically translating upper cushioned pad 67. It should be noted that by constructing the lower portion of cushioned pad 67 substantially in a wedge shape as with beveled surface 10, the cushioned pad continues to provide a comfortable head support without requiring the child to strain his or her neck.

As shown in FIG. 6, an outer cloth or other "fabric" surface material, such as vinyl or leather, cover 76 is wrapped around foam cushion 74 of the cushion assembly 64. The manner in which foam cushion and the surrounding cover is secured to rigid structure 78 may be accomplished as disclosed in the aforesaid U.S. Pat. No. 5,224,756 incorporated by reference.

FIG. 7 is a sectional side view of a fixed guide member 86 of the present invention, including the respective annular bushing 104 thereof which receives the aforementioned respective stem portion 100 in slidable relation. As shown, annular bushing 104 is preferably made from an elastomeric material and is adapted to act as a slide permitting pivot point for stem portion 100. The bushing 104 has an inner rounded surface 220 and an appropriate inner diameter which causes stem portion 100 to be effectively wedged therein when the child seat module 18 is disposed in both the adult mode position and the child mode position. This wedge effect muffles noise created within the vehicle due to rattling and/or vibratory movement in the child seat back frame 80 which might occur during movement of the vehicle.

It thus will be seen that the objects of this invention have been fully and effectively accomplished. It will be realized, however, that the foregoing preferred specific embodiment has been shown and described for the purpose of this invention and is subject to change without departure from such principles. Therefore, this invention includes all modifications encompassed within the spirit and scope of the following claims.

What is claimed is:

1. A motor vehicle seat providing an integrated child seat comprising:

a seat frame assembly for securement within the motor vehicle interior;

a seat cushion carried by said seat frame assembly in a position to enable an adult occupant of the motor vehicle to sit thereon;

a seat back frame assembly mounted in operative relation with respect to said seat frame assembly;

side cushions carried by said seat back frame assembly in positions to be engaged by the back of an adult seat occupant sitting on said seat cushion, said side cushions being spaced apart a distance sufficient to define a space therebetween of a size to enable a child to be disposed therebetween;

a plurality of cushion assemblies constructed and arranged to be moved between i) an adult mode position wherein said cushion assemblies are disposed within said space and provide support to the back of an adult seat occupant sitting on said seat cushion and ii) a child mode position wherein said cushion assemblies provide a cushioned child seat, a cushioned child seat back, and a cushioned child head support for supporting the seat, back and head of a child seat occupant respectively, said plurality of cushion assemblies including (1) a movable first cushion assembly mounted for movement between (a) said adult mode position wherein said movable first cushion assembly is disposed within said space and provides a cushioned adult seat back lower portion for engaging the lower back of an adult seat occupant sitting on said seat cushion, and (b) said child mode position wherein said movable first cushion assembly is disposed in a position so as to provide a child's seat support in overlying relation to said seat cushion, and (2) a movable second cushion assembly including an upper cushioned pad disposed in said space and providing support to an adult seat occupant sitting on said seat cushion when said cushion assemblies are in said adult mode position, an interconnecting assembly operatively connecting said movable second cushion assembly to said first cushion assembly so that movement of said movable first cushion assembly causes responsive movement of at least said upper cushioned pad of said movable second cushion assembly, said upper cushioned pad being moved i) upwardly by said interconnecting assembly so as to project above the adult seat back in response to movement of said first cushion assembly from said adult mode position to said child mode position so that said upper cushioned pad provides support to the back of the head of a child seat occupant sitting on said movable first cushion assembly providing said child's seat support in said overlying relation to said seat cushion, and ii) downwardly in response to movement of said first cushion assembly from said child mode position to said adult mode position so that said upper cushioned pad provides support to an adult seat occupant sitting on said seat cushion when said cushion assemblies are in said adult mode position; and a harness assembly constructed and arranged for extension over the shoulders of a child seat occupant sitting on the child seat when said plurality of cushion assemblies are in said child mode position, said harness assembly having an anchor point disposed between the legs of a child seat occupant.

2. The seat according to claim 1, wherein said movable second cushion assembly includes a child seat back frame having at least a lower portion thereof interconnected to said first cushion assembly so as to be movable forwardly within said space in response to movement of said first cushion assembly from said adult mode position to said child mode position for providing back support to a child seat occupant sitting on said first cushion assembly disposed in said overlying relation to said seat cushion when said cushion assemblies are in said child mode position.

3. The seat according to claim 2, wherein said first cushion assembly extends in self-sustaining cantilevered overlying relation to said seat cushion to provide a child's seat support which forms a predetermined angle with respect to said child seat back frame when said first cushion assembly is moved to said child mode position.

4. The seat according to claim 3, wherein said child seat back frame is inclined to a greater extent relative to said seat back frame assembly when said first cushion assembly is in said child mode position than when said first cushion assembly is in said adult mode position.

5. The seat according to claim 3, wherein said predetermined angle formed between said child seat back frame and said first cushion assembly is between about 95° to 105°.

6. The seat according to claim 5, wherein said seat back frame assembly is inclined at an angle of about 109° relative to said seat frame assembly.

7. The seat according to claim 4, wherein said plurality of cushion assemblies further comprise a cushion pad detachably mounted on said child seat back frame in a position to provide said cushioned child seat back with cushioning and extending forwardly over said movable first seat cushion to provide said cushioned child seat with cushioning.

8. The seat according to claim 7, wherein said upper cushioned pad of said movable second cushion assembly is rigidly connected with an upper portion of said child seat back frame.

9. The seat according to claim 8, wherein said interconnecting assembly comprises:

a pair of side support members fixed to opposite sides of said first movable cushion assembly, a pair of anchor members fixed to opposite sides of said seat back frame assembly, and a linkage assembly connecting each of said side support members with a respective one of said anchor members;

said side support members being movable with said first movable cushion assembly between said adult mode position and said child mode position;

said child seat back frame having said lower portion thereof pivotally connected to said side support members so as to be movable forwardly within said space so as to form said predetermined angle relative to said first cushion assembly in response to movement of said first cushion assembly with said side support members thereof from said adult mode position to said child mode position.

10. The seat according to claim 9, wherein said seat back frame assembly includes a child seat back frame guide for guiding movement of said child seat back frame during movement thereof between said child mode position and said adult mode position.

11. The seat according to claim 10, wherein said child seat back frame comprises a pair of stem portions generally disposed at opposite sides thereof, said child seat back frame guide comprising a pair of bushings each for receiving a respective one of said opposing stem portions in slidable relation.

12. The seat according to claim 11, wherein said bushings are substantially annular and have inner convex edges providing a bearing surface for said respective stem portions in slidable relation, said bushings having an inner diameter of a specified dimension so as to maintain rigid contact with said stem portions in both said adult mode and child mode positions so as to prevent rattling of said child seat back frame due to vibrations caused by movement of said vehicle.

13. The integrated child seat of claim 9, wherein said first movable cushion assembly includes i) a rigid structure, said pair of side support members being connected to opposite sides of said rigid structure for pivotally connecting said rigid structure with opposite lower ends of said child seat back frame, and ii) a foamed cushion mounted on a major surface of said rigid structure providing cushioning for said cushioned adult seat back lower portion for engaging the lower back of an adult seat occupant sitting on said seat cushion when said cushion assemblies are in said adult mode position.

14. The seat of claim 1, wherein said harness assembly comprises a pair of shoulder belts extending forwardly of said child seat back frame through openings in said upper cushioned pad and over the shoulders of a child seat occupant, said shoulder belts having connectors capable of being secured at said anchor point disposed between the legs of a child seat occupant.

15. The seat of claim 14, wherein said harness assembly further comprises:

- a crotch belt connected at one end thereof to said first movable cushion assembly at said anchor point between the legs of a child seat occupant, said crotch belt having a buckle connected at an opposite end thereof for connection with said connectors of said shoulder belts;
- a dividing member for connecting ends of said shoulder belts behind said child seat back frame to a single belt member; and
- a takeup reel for receiving said single belt member, said takeup reel capable of taking-up slack in said harness assembly so as to increase tension in said harness assembly.

16. The seat of claim 1, wherein said upper cushioned pad comprises a front exterior surface for providing said support to an adult seat occupant sitting on said seat cushion when said cushion assemblies are in said adult mode position, said front exterior surface including a lower beveled portion serving as said support for the back of the head of a child seat occupant sitting on said movable first cushion assembly when said cushion assemblies are in said child mode position.

17. A motor vehicle seat providing an integrated child seat comprising:

- a seat frame assembly for securement within the motor vehicle interior;
- a seat cushion carried by said seat frame assembly in a position to enable an adult occupant of the motor vehicle to sit thereon;
- a seat back frame assembly mounted in operative relation with respect to said seat frame assembly;
- side cushions carried by said seat back frame assembly in positions to be engaged by the back of an adult seat occupant sitting on said seat cushion, said side cushions being spaced apart a distance sufficient to define a space therebetween of a size to enable a child to be disposed therebetween;
- a plurality of cushion assemblies constructed and arranged to be moved between i) an adult mode position wherein said cushion assemblies are disposed within said space and provide support to the back of an adult seat occupant sitting on said seat cushion with a desired angular relationship between the adult seat occupant's seat and back and ii) a child mode position wherein said cushion assemblies provide a cushioned child seat, a cushioned child seat back, and a cushioned child head support for supporting the seat, back and head of a child seat occupant respectively, said plurality of cushion assemblies including (1) a movable first cushion assembly mounted for movement between (a) said adult mode position wherein said movable first cushion assembly is disposed within said space and provides a cushioned adult seat back lower portion for engaging the lower back of an adult seat occupant sitting on said seat cushion, and (b) said child mode position wherein said movable first cushion assembly extends in self-sustaining cantilevered overlying relation to said seat cushion to provide a child's seat support which extends forwardly and upwardly to a greater extent than the seat support provided by said seat cushion, and (2) a movable second cushion assembly providing a child's seat back support disposed within said space inwardly of said first movable cushion assembly when said cushion assemblies are in said adult mode position,
- an interconnecting assembly operatively connecting said movable second cushion assembly to said first cushion assembly so that movement of said movable first cushion assembly causes responsive movement of said movable second cushion assembly, said movable second cushion assembly being moved i) angularly and upwardly with respect to the adult back support in response to movement of said first cushion assembly from said adult mode position to said child mode position so that said child's seat back support forms a greater angle with respect to a vertical plane than the adult back support and provides support to the back of a child seat occupant sitting on said child's seat support provided by said movable first cushion assembly with a desired angular relationship between the child seat occupant's seat and back, and ii) angularly and downwardly in an opposite direction in response to movement of said first cushion assembly from said child mode position to said adult mode position; and
- a harness assembly constructed and arranged for extension over the shoulders of a child seat occupant sitting on the child seat when said plurality of cushion assemblies are in said child mode position, said harness assembly having an anchor point disposed between the legs of a child seat occupant.

18. A seat according to claim 17, wherein said movable second cushion assembly includes an upper cushioned pad disposed in said space and providing support to an adult seat occupant sitting on said seat cushion when said cushion assemblies are in said adult mode position.

19. A seat according to claim 18, wherein said upper cushioned pad is capable of being moved i) upwardly in response to movement of said first cushion assembly from said adult mode position to said child mode position so that said upper cushioned pad provides support to the back of the head of a child seat occupant sitting on said movable first cushion assembly providing said child's seat support in said overlying relation to said seat cushion, and ii) downwardly in response to movement of said first cushion assembly from said child mode position to said adult mode position so that said upper cushioned pad provides support to an adult seat occupant sitting on said seat cushion when said cushion assemblies are in said adult mode position.

20. A seat according to claim 19, wherein said movable second cushion assembly includes a child seat back frame having at least a lower portion thereof movable forwardly within said space in response to movement of said first cushion assembly from said adult mode position to said child mode position for providing said child's seat back support.

21. The seat according to claim 17, wherein said plurality of cushion assemblies further comprise a cushion pad detachably mounted on said child seat back frame in a position to provide said cushioned child seat back and extending forwardly over said movable first seat cushion to provide therewith said cushioned child seat.

22. The seat according to claim 21, wherein said upper cushioned pad of said movable second cushion assembly is fixed to an upper portion of said child seat back frame.

23. The seat according to claim 17, wherein said interconnecting assembly comprises:

a pair of side support members fixed to opposite sides of said first movable cushion assembly, a pair of anchor members fixed to opposite sides of said seat back frame assembly, and a linkage assembly connecting each of said side support members with a respective one of said anchor members;

said side support members being movable with said first movable cushion assembly between said adult mode position and said child mode position;

said child seat back frame having said lower portion thereof pivotally connected to said side support members so as to be movable forwardly within said space so as to form said predetermined angle relative to said first cushion assembly in response to movement of said first cushion assembly with said side support members thereof from said adult mode position to said child mode position.

24. The seat of claim 23, wherein said harness assembly further comprises:

a crotch belt connected at one end thereof to said first movable cushion assembly at said anchor point between the legs of a child seat occupant, said crotch belt having a buckle connected at an opposite end thereof for connection with said connectors of said shoulder belts;

a dividing member for connecting ends of said shoulder belts behind said child seat back frame to a single belt member; and a takeup reel for receiving said single belt member, said takeup reel capable of taking-up slack in said harness assembly so as to increase tension in said harness assembly.

25. The seat of claim 24, wherein portions of said shoulder belts extending through said connectors serve as thigh belts, and wherein said shoulder belts are secured at lower ends thereof to said side support members.

26. The seat according to claim 23, wherein said first movable cushion assembly includes i) a rigid structure, said pair of support members being connected to opposite sides of said rigid structure for pivotally connecting said rigid structure with opposite lower ends of said child seat back frame, and ii) a foamed cushion mounted on a major surface of said rigid structure providing cushioning for said cushioned adult seat back lower portion for engaging the lower back of an adult seat occupant sitting on said seat cushion when said cushion assemblies are in said adult mode position.

27. The seat according to claim 17, wherein said seat back frame assembly includes a child seat back frame guide for guiding movement of said child seat back frame during movement thereof between said child mode position and said adult mode position.

28. The seat according to claim 27, wherein said child seat back frame comprises a pair of stem portions generally disposed at opposite sides thereof, said child seat back frame guide comprising a pair of bushings each for receiving a respective one of said opposing stem portions in slidable relation.

29. The seat according to claim 28, wherein said bushings are substantially annular and have inner rounded edges providing a bearing surface for said respective stem portions in slidable relation, said bushings having an inner diameter of a specified dimension so as to maintain rigid contact with said stem portions in both said adult mode and child mode positions so as to inhibit movement of said child seat back frame during movement of said vehicle.

30. The seat of claim 17, wherein said shoulder belts extend over a belt mounting rod rigidly secured to said child seat back frame.

31. The seat of claim 30, wherein said shoulder belts extend from said belt mounting rod and through openings in said upper cushioned pad.

32. The seat of claim 31, wherein a lower portion of said upper cushioned pad has a substantially wedge shaped portion.

33. A seat according to claim 17, wherein said desired angular relationship between the adult seat occupant's seat and back is about 109°.

34. A seat according to claim 17, wherein said desired angular relationship between the child seat occupant's seat and back is between about 95° to 105°.

35. A motor vehicle seat providing an integrated child seat comprising:

a seat frame assembly for securement within the motor vehicle interior;

a seat cushion carried by said seat frame assembly in a position to enable an adult occupant of the motor vehicle to sit thereon;

a seat back frame assembly mounted in operative relation with respect to said seat frame assembly;

side cushions carried by said seat back frame assembly in positions to be engaged by the back of an adult seat occupant sitting on said seat cushion, said side cushions being spaced apart a distance sufficient to define a space therebetween of a size to enable a child to be disposed therebetween;

a plurality of cushion assemblies constructed and arranged to be moved between i) an adult mode position wherein said cushion assemblies are disposed within said space and provide support to the back of an adult seat occupant sitting on said seat cushion with a desired angular relationship between the adult seat occupant's seat and back and ii) a child mode position wherein said cushion assemblies provide a cushioned child seat, a cushioned child seat back, and a cushioned child head support for supporting the seat, back and head of a child seat occupant respectively, said plurality of cushion assemblies including (1) a movable first cushion assembly mounted for movement between (a) said adult mode position wherein said movable first cushion assembly is disposed within said space and provides a cushioned adult seat back lower portion for engaging the lower back of an adult seat occupant sitting on said seat cushion, and (b) said child mode position wherein said movable first cushion assembly extends in self-sustaining cantilevered overlying relation to said seat cushion to provide a child's seat support which extends forwardly and upwardly to a greater extent than the seat support provided by said seat cushion, and (2) a movable second cushion assembly including an upper cushioned pad and a child's seat back support, said child's seat back support disposed inwardly of said first movable cushion assembly and in said space when said cushion assemblies are in said adult mode position, said upper cushioned pad being disposed in said space and providing support to an adult seat occupant sitting on said seat cushion when said cushion assemblies are in said adult mode position, an interconnecting assembly operatively connecting said movable second cushion assembly to said first cushion assembly so that movement of said movable first cushion assembly causes responsive movement of said movable second cushion assembly, said movable second cushion assembly being moved i) angularly and upwardly with respect to the adult back support in response to movement of said first cushion assembly from said adult mode position to said child mode position so that said child's seat back support forms a greater angle with respect to a vertical plane than the adult back support and provides support to the back of a child seat occupant sitting on said child's seat support provided by said movable first cushion assembly with a desired angular relationship between the child seat occupant's seat and back, and so that said upper cushioned pad provides support to the back of the head of a child seat occupant sitting on said child's seat support provided by said movable first cushion assembly, and ii) angularly in an opposite direction in response to movement of said first cushion assembly from said child mode position to said adult mode position; and a harness assembly constructed and arranged for extension over the shoulders of a child seat occupant sitting on the child seat when said plurality of cushion assemblies are in said child mode position, said harness assembly having an anchor point disposed between the legs of a child seat occupant.

\* \* \* \* \*